United States Patent
Keller et al.

(10) Patent No.: US 9,022,067 B2
(45) Date of Patent: May 5, 2015

(54) DUAL VARIABLE VALVE SOLENOID MODULE

(75) Inventors: Robert D. Keller, Davisburg, MI (US); Robert J. Boychuk, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 1063 days.

(21) Appl. No.: 12/575,792

(22) Filed: Oct. 8, 2009

(65) Prior Publication Data

US 2010/0089347 A1 Apr. 15, 2010

Related U.S. Application Data

(60) Provisional application No. 61/103,959, filed on Oct. 9, 2008.

(51) Int. Cl.
*F16K 31/02* (2006.01)
*F16K 31/06* (2006.01)

(52) U.S. Cl.
CPC .................................. *F16K 31/0655* (2013.01)

(58) Field of Classification Search
USPC .......... 123/90.11–90.13; 137/596.17, 596.12, 137/596.2, 625.26, 625.27
See application file for complete search history.

(56) References Cited

U.S. PATENT DOCUMENTS

| 2,340,399 | A | * | 2/1944 | Macy ........................ 137/625.67 |
| 2,587,356 | A | * | 2/1952 | McPherson .................... 137/613 |
| 4,145,091 | A | * | 3/1979 | Bueler et al. ................ 303/118.1 |
| 4,736,177 | A | * | 4/1988 | Vollmer et al. ................ 335/299 |
| 5,642,756 | A |   | 7/1997 | Lawrence et al. |
| 7,021,256 | B2 | * | 4/2006 | Wagner et al. ............. 123/90.11 |
| 7,107,952 | B2 | * | 9/2006 | Palesch et al. ............. 123/90.17 |
| 7,341,033 | B2 |   | 3/2008 | Yoshijima et al. |
| 2004/0144349 | A1 |  | 7/2004 | Wampula et al. |
| 2006/0027199 | A1 |  | 2/2006 | Yoshijima et al. |
| 2007/0108401 | A1 |  | 5/2007 | Shibata et al. |
| 2008/0178828 | A1 | * | 7/2008 | Patel et al. .................. 123/90.12 |

FOREIGN PATENT DOCUMENTS

| DE | 9300848 U1 | 5/1994 |
| EP | 0728655 A2 | 8/1996 |
| JP | H0260780 A | 3/1990 |
| JP | H10103034 A | 4/1998 |
| JP | 2006153223 A | 6/2006 |

OTHER PUBLICATIONS

Japanese Office Action for Japanese Patent Application No. 2011-531198 dated Oct. 30, 2013.

* cited by examiner

*Primary Examiner* — Craig Schneider
*Assistant Examiner* — Minh Le
(74) *Attorney, Agent, or Firm* — Remarck Law Group PLC

(57) ABSTRACT

A solenoid valve module includes a first solenoid valve having a first solenoid portion and a first valve body and a second solenoid valve having a second solenoid portion and a second valve body. The first valve body and the second valve body are integrally formed by a solenoid housing. The solenoid valve module is secured to a surface of an engine to provide hydraulic control for an engine component.

31 Claims, 5 Drawing Sheets

DUAL VARIABLE VALVE SOLENOID MODULE

CROSS-REFERENCE TO RELATED APPLICATIONS

This application claims the benefit of U.S. Provisional Application 61/103,959, filed Oct. 9, 2008, which is hereby incorporated by reference in its entirety.

TECHNICAL FIELD

The present invention relates to an electrically operated hydraulic control mechanism such as a solenoid valve, and more particularly, to a module having dual solenoid valves.

BACKGROUND OF THE INVENTION

Solenoid control valves for hydraulic control systems are used to control oil under pressure that may be used to switch latch pins in switching lifters, lash adjusters, etc. in engine valve systems. Valve lifters are engine components that control the opening and closing of exhaust and intake valves in an engine. Lash adjusters may also be used to deactivate exhaust and intake valves in an engine. Engine valves may be selectively deactivated or locked out to disable operation of some cylinders in an engine when power demands on an engine are reduced. By deactivating cylinders, fuel efficiency of an engine may be improved. Multiple solenoid valves are required for each engine to independently control the multiple engine valves and associated lifters and lash adjusters.

SUMMARY OF THE INVENTION

A solenoid valve module according to one embodiment of the invention includes a first solenoid valve having a first solenoid portion and a first valve body; a second solenoid valve having a second solenoid portion and a second valve body. The first valve body and the second valve body are integrally formed by a single solenoid housing.

A hydraulic control circuit for an engine according to one embodiment of the invention includes a solenoid valve module. The solenoid valve module includes a first solenoid valve, a second solenoid valve, and a solenoid housing. The solenoid housing defines a first valve body for the first solenoid valve and a second valve body for the second solenoid valve. The solenoid valve module is secured to a surface of the engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
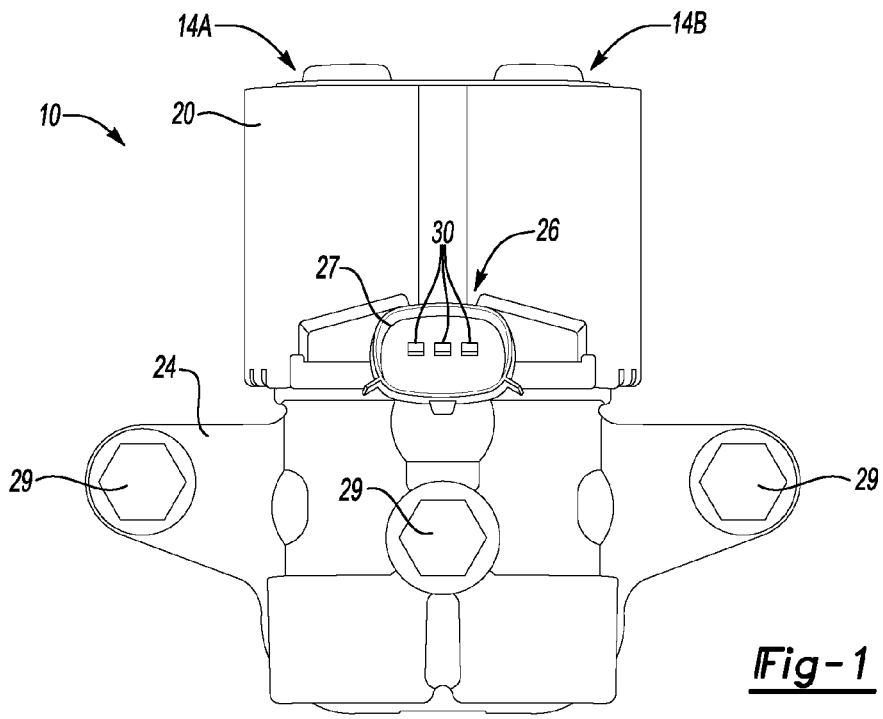
FIG. 1 is a first schematic plan view of a solenoid valve module.
Figure 2:
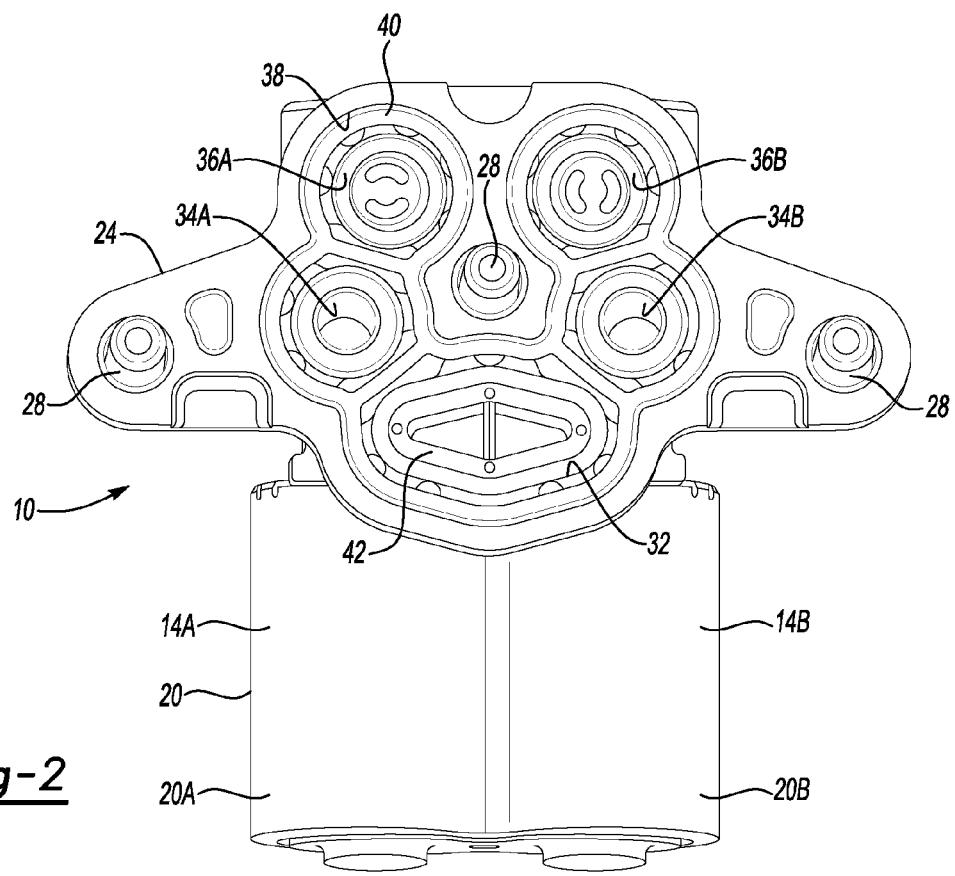
FIG. 2 a second schematic plan view of the solenoid valve module shown in FIG. 1.

FIGS. 1 and 2 illustrates a solenoid valve module 10 having a deactivation mechanism such as, for example, latch pins that deactivate lifters and lash adjusters in an internal combustion engine or diesel engine. The solenoid valve module 10 is installed on or in an engine 12 (shown schematically in FIG. 3). The solenoid valve module 10 includes a first solenoid valve 14A and a second solenoid valve 14B. The first solenoid valve 14A includes a first solenoid portion 16A and a first valve body 18A, and the second solenoid valve 14B includes a second solenoid portion 16B and a second valve body 18B. The first and second solenoid portions 16A and 16B and the first and second valve bodies 18A and 18B are located within the solenoid valve module 10. The first solenoid valve 14A and the second solenoid valve 14B operate in a typical manner to provide fluid control as is known in the art.

Figure 4:
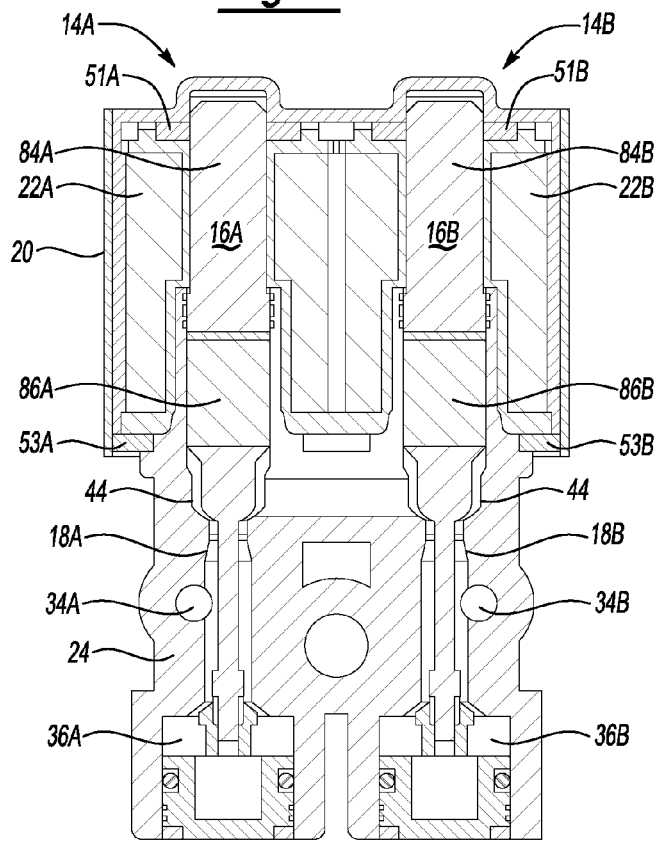
FIG. 4 is a schematic cross-sectional front view of the solenoid valve module of FIGS. 1-3.

Referring to FIGS. 1-2 and 4, the solenoid valve 10 is shown to include a solenoid can 20 that houses a first coil 22A that powers the first solenoid valve 14A and a second coil 22B that powers the second solenoid valve 14B. The valve body 18A and the valve body 18B are integrally formed by a solenoid housing 24. The solenoid can 20 and the solenoid housing 24 may be secured to one another. Although the solenoid can 20 is illustrated as a single can the solenoid can 20 may include multiple pieces such as, for example, a first solenoid can portion 20A to cover the first solenoid valve 14A and a second solenoid can portion 20B to cover the second solenoid valve 14B. An electrical connector 26 may also be secured to either or both of the solenoid can 20 and the solenoid housing 24.

The solenoid valve module 10 includes the solenoid can 20, the solenoid housing 24 and the connector housing 26 and may be assembled onto the engine 10 as a single assembly. The solenoid valve module 10, therefore, provides a completely contained control valve for a hydraulic control circuit 13 for the engine 12.

The solenoid housing 24 defines a plurality of attachment apertures 28. A plurality of fasteners 29 may extend through the plurality of apertures 28 to secure the solenoid valve module 10 to the engine 12. In the embodiment shown, there are three attachment apertures 28, but greater or fewer apertures may be used depending on the configuration of the solenoid valve module 10 and the engine 12. The attachment apertures 28 allow for quick and easy installation of the solenoid valve module 10 to the engine 12, which will be explained in greater detail below.

The electrical connector 26 extends from and is mounted to at least one the solenoid housing 24 and the solenoid can 20. The electrical connector 26 includes connector housing 27 which surrounds and protects a plurality of connector prongs 30. In the embodiment shown, there are three electrical connector prongs 30, which provide independent electrical control of the first solenoid valve 14A and the second solenoid valve 14B. The electrical connector 26 provides a common electrical attachment of the first solenoid valve 14A and the second solenoid valve 14B to reduce the number of components and make wiring of the solenoid valve module 10 to the engine 12 easier. The connector housing 27 may additionally act as a guide to assist in the electrical connection of the solenoid valve module 10 to the engine 12. The connector housing 27 may have an asymmetric shape to ensure correct electrical connection of the connector prongs 30 to the first solenoid valve 14A and the second solenoid valve 14B.

The solenoid housing 24 also defines a supply port 32, a first control port 34A, a second control port 34B, a first exhaust port 36A and a second exhaust port 36B. Corresponding ports may be formed within the engine 12 to direct fluid from the solenoid valve module 10 to the required location within the engine 12, i.e. to the switch pins for the engine valves, lifters, and lash adjusters. A groove 38 may be formed in the solenoid housing 24 to receive a gasket 40. The gasket 40 assists in sealing the solenoid valve module 10 to the engine 12. The portion of the engine 12 to which the solenoid valve module 10 is attached may be machined to facilitate sealing of the solenoid valve module 10 to the engine 12.

Because the first valve body 18A and the second valve body 18B are defined by the solenoid housing 24, the engine 12 does not need to be machined internally to receive the valve bodies or portions of the valve bodies. However, the surface of the engine 12 where the solenoid valve module 10 is attached may be machined to assist in sealing the solenoid valve module 10 to the engine 12. Thus, the solenoid valve module 10 may be mounted to the engine 12 in an area that is convenient for the operation and packaging of that particular engine 12 and solenoid valve module 10. For example, the solenoid valve module 10 may be mounted to a cover for the engine 12 and is not required to be mounted to a block (not shown) of the engine 12 or internally under a cover for the engine 12. Therefore, the solenoid valve module 10 may be mounted to the engine 12 in an area where space is not as limited to provide easier service and assembly, and/or to an area that may enhance performance of the solenoid valve module 10.

A filter 42 may be inserted within the supply port 32 to reduce contaminants and debris within the fluid from entering the first solenoid valve 14A and the second solenoid valve 14B. The supply port 32 extends to a supply gallery 44, which is a common supply gallery 44 for the first solenoid valve 14A and the second solenoid valve 14B. The first solenoid valve 14A and the second solenoid valve 14B may be operated independently of one another. Therefore, the pressure within the supply gallery 44 is sufficient to maintain independent operation of the first solenoid valve 14A and the second solenoid valve 14B.

Figure 3:
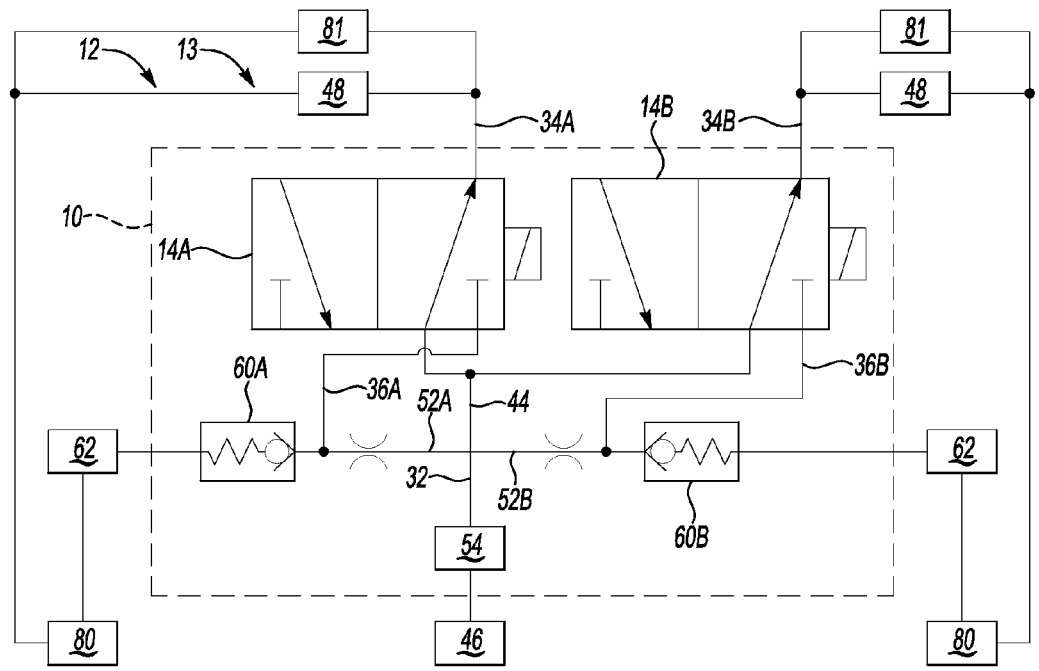
FIG. 3 is a schematic illustration of an engine for a vehicle having the solenoid valve module of FIGS. 1 and 2.

Referring to FIGS. 3 and 4, a first embodiment for a method of operating the first solenoid valve 14A and the second solenoid valve 14B is explained. The solenoid valve module 10 controls the flow from an oil supply 46 to latch pins 48 which control the valves, lifters, and lash adjusters, etc. within the engine 12. The oil may then flow over other engine components 81 before returning to the oil sump 80.

The first solenoid valve 14A has a first flux circuit formed by a first top flux collector 51A, a first pole piece 84A, a first bottom flux collector 53A, and a first armature 86A. The first top flux collector 51A, the first pole piece 84A, the first bottom flux collector 53A, and the first armature 86A are assembled within the solenoid can 20. By energizing or de-energizing the first coil 22A the first armature 86A is acted upon by the flux to shift the first solenoid valve stem 50A within the first valve body 18A. Likewise, the second solenoid valve 14B has a second flux circuit formed by a second top flux collector 51B, a second pole piece 84B, a second bottom flux collector 53B, and a second armature 86B. The second top flux collector 51B, the second pole piece 84B, the second bottom flux collector 53B, and the second armature 86B are assembled within the solenoid can 20. By energizing or de-energizing the second coil 22B the second armature 86B is acted upon by the flux to shift the second solenoid valve stem 50B within the second valve body 18B.

The first top flux collector 51A and the second top flux collector 51B may be separate pieces, or the first top flux collector 51 may be a common piece to act as the first top flux collector 51A and the second top flux collector 51B. Alternatively, when the solenoid can 20 is multiple pieces the first solenoid can portion 20A may act as the first top flux collector 51A and the second solenoid can portion 20B may act as the second top flux collector 51B. When a common solenoid can 20 is used the solenoid can 20 can act as the first and second top flux collector 51A, 51B for the first solenoid valve 14A and the second solenoid valve 14B. Additionally, the first bottom flux collector 53A may be a common piece to act as the first bottom flux collector 53A and the second bottom flux collector 53B.

The oil enters the solenoid valve module 10 through a supply port 32 and flows through to a supply gallery 44. When the first solenoid valve 14A or the second solenoid valve 14B are moved to the proper position oil flows from the supply gallery 44 to a first control port 34A for the first solenoid valve 14A or to a second control port 34B for the second solenoid valve 14B. Operation of the first solenoid valve 14A varies pressure within the first control port 34A and operation of the second solenoid valve 14B varies pressure within the second control port 34B to control the respective latch pins 48. Oil flow from the latch pins 48 may also flow to the other engine 12 components prior to returning to the oil sump 80.

Figure 5:
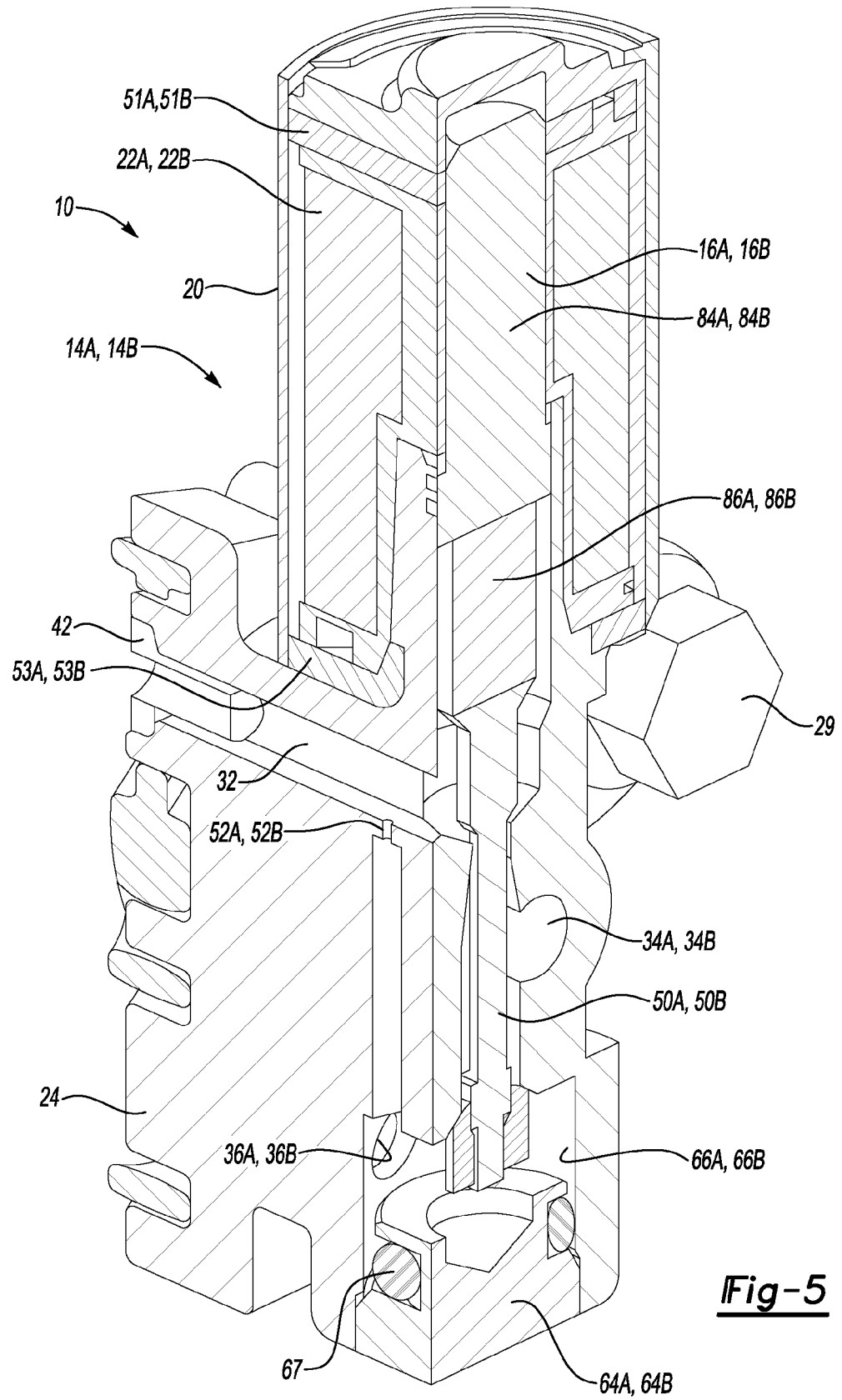
FIG. 5 is a schematic perspective cross-sectional view illustrating a bypass orifice for the solenoid valve module of FIGS. 1-4.

Referring to FIGS. 3 and 5, the first solenoid valve 14A has a first bypass passage 52A to allow a portion of the oil flow to flow directly from the supply port 32 or supply gallery 44 to the first exhaust port 36A. Likewise, the second solenoid valve 14B has a second bypass passage 52B to allow a portion of the oil flow to flow directly from the supply port 32 or supply gallery 44 to the second exhaust port 36B. The first bypass passage 52A and the second bypass passage 52B may be defined by the solenoid housing 24. The first bypass passage 52A and the second bypass passage 52B may assist in efficient operation of the first solenoid valve 14A and the second solenoid valve 14B, as explained below.

Referring to FIGS. 3 and 4 again, a first exhaust regulator 60A controls the pressure of oil within the first exhaust port 36A and a second exhaust regulator 60B controls the pressure of oil from within the second exhaust port 36B. Oil from the supply port 32 is vented into the first or second exhaust ports 36A and 36B through the first and the second bypass passages 52A and 52B. The first exhaust regulator 60A and the second exhaust regulator 60B acts as pressure relief valves to control the pressure of oil in the first exhaust port 36A and the second exhaust port 36B. Additionally, when the first coil 22A is de-energized, the oil from the first exhaust port 36A may flow back through the first control port 34A to feed the latch pins 48 and other engine components 81. Likewise, when the second coil 22B is de-energized, the oil from the second exhaust port 36B may flow back through the second control port 34B to feed the latch pins 48 and other engine components 81.

As mentioned above, because the first valve body 18A and the second valve body 18B are internal to the solenoid housing 24, the solenoid valve module 10 can be mounted anywhere on the engine 12. In the embodiment shown in FIG. 3, the solenoid valve module 10 is mounted to the cover of the engine 12. Mounting the solenoid valve module 10 to the cover of the engine 12 locates the solenoid valve module 10 above most of the engine components 81, allowing oil from the first exhaust port 36A and the second exhaust port 36B to flow to a drip rail 62 for the engine 12. Oil may flow from the first solenoid valve 14A in a first direction to provide oil for a first portion of the drip rail 62 and from the second solenoid valve 14B in a second direction to provide oil for a second portion of the drip rail 62.

Figure 6:
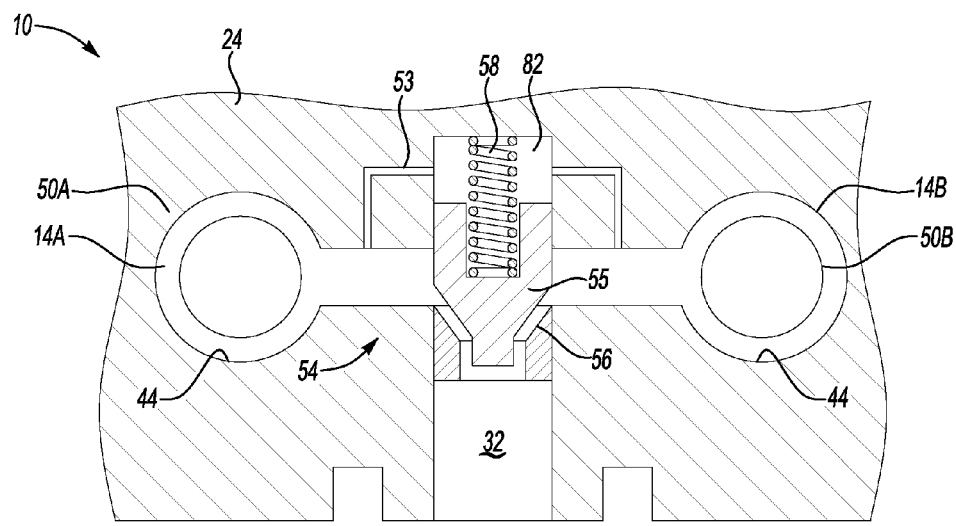
FIG. 6 is an enlarged schematic cross-sectional view of a portion of the solenoid valve module of FIGS. 1-5.

Referring to FIGS. 3 and 6, a pre-regulator 54 may be used to reduce the maximum oil pressure and therefore reduce oil consumption by the engine 12. As shown, the pre-regulator 54 may be located within the supply port 32 of the solenoid housing 24 between the first solenoid valve 14A and the second solenoid valve 14B. Oil flows from the supply port 32 through the supply gallery 44 into the first solenoid valve 14A and the second solenoid valve 14B.

When the pressure in the supply gallery 44 decreases. oil flows from a chamber 82 through a regulator bypass passage 53 to the supply gallery 44. The corresponding decrease in pressure of chamber 82 increases the pressure differential across a poppet valve 55. The pressure differential across the poppet valve 55 acts against the force of a spring 58 moving the poppet valve 55 away from a seat 56 for the pre-regulator 54 and allowing more oil to pass into the supply gallery 44. As the pressure within the supply gallery 44 begins to increase the pressure within the chamber 82 will also increase until equilibrium is established. In the embodiment shown, there are multiple regulator bypass passages 53 shown. However, only one regulator bypass passage 53 may be necessary for effective operation of the pre-regulator 54.

Figure 7:
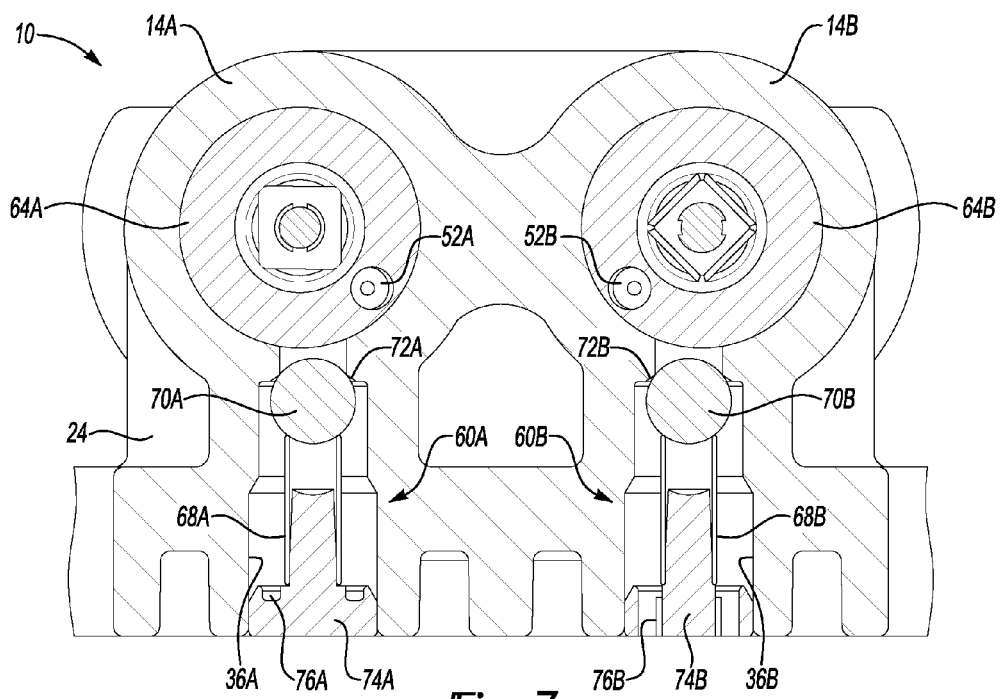
FIG. 7 is an enlarged schematic bottom view of the exhaust ports for the solenoid valve module of FIGS. 1-6.
Figure 8:
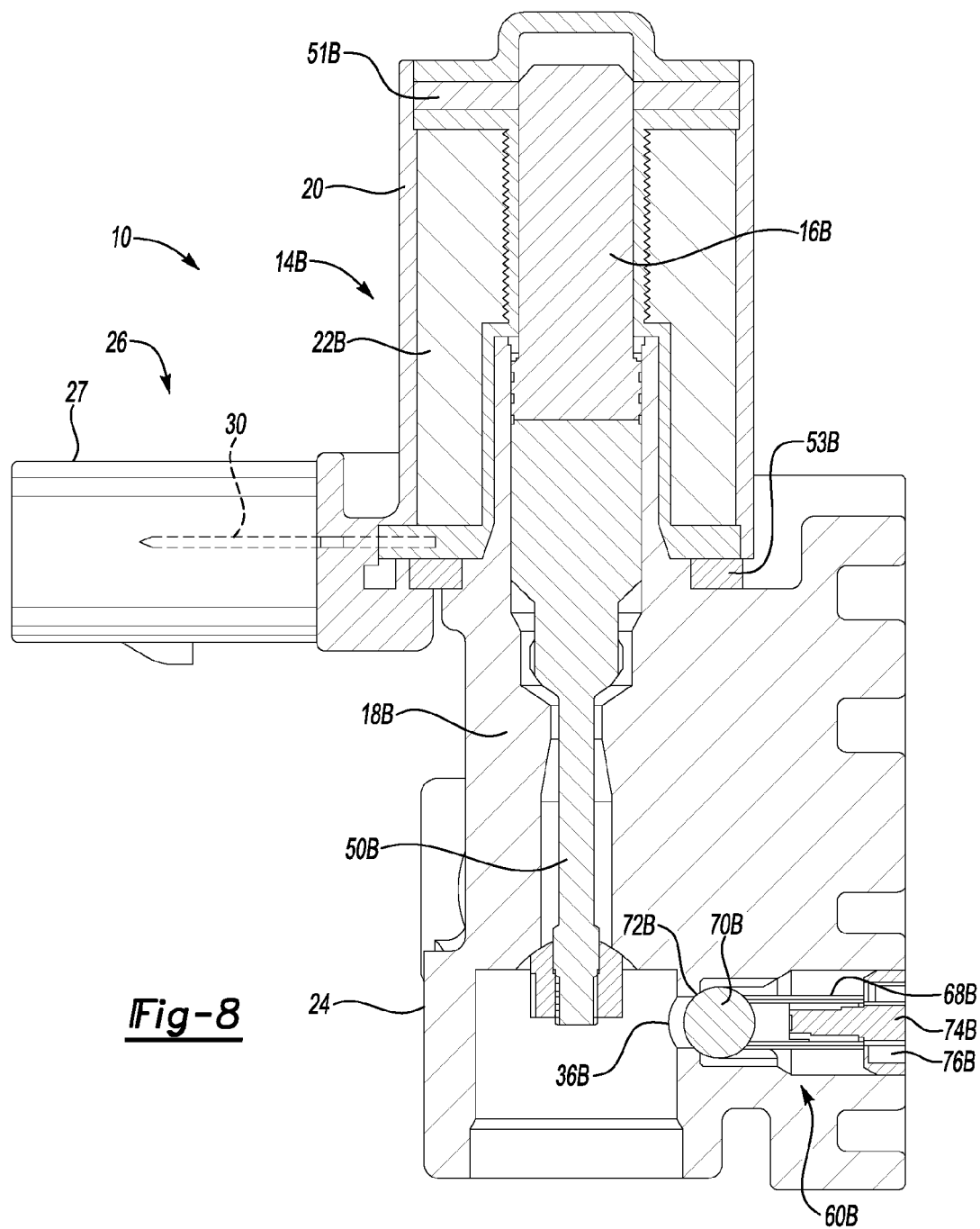
FIG. 8 is a schematic cross-sectional side view of the solenoid valve module of FIGS. 1-7.

Referring to FIGS. 5 and 7-8 the first exhaust regulator 60A and the second exhaust regulator 60B are explained in further detail. A first plug 64A is inserted within a first passage 66A defined by the solenoid valve housing 24, and a second plug 64B is inserted within a second passage 66B within the solenoid valve housing 24. The first plug 64A may be removed to allow access to the first solenoid valve 14A through the first passage 66A, and the second plug 64B may be removed to allow access to the second solenoid valve 14B through the second passage 66B. The first plug 64A and the second plug 64B allow access to the first solenoid valve 14A and the second solenoid valve 14B for maintenance and repair. The first plug 64A and the second plug 64B also seal the first exhaust port 36A and the second exhaust port 36B from the exterior of the solenoid valve module 10. O-rings 67 may be used to seal the first plug 64A within the first passage 66A and the second plug 64B within the second passage 66B.

The first exhaust regulator 60A has a first spring 68A that biases a first ball 70A against a first exhaust seat 72A and the second exhaust regulator 60B has a second spring 68B that biases a second ball 70B against a second exhaust seat 72B. Fluid flowing from the first solenoid valve 14A acts on the first ball 70A to overcome the force of first spring 68A allowing oil to pass through the first exhaust regulator 60A and relieving pressure within the first exhaust port 36A. Likewise, fluid flowing from the second solenoid valve 14B acts on the second ball 70B to overcome the force of second spring 68B allowing oil to pass through the second exhaust regulator 60B and relieving pressure within the second exhaust port 36B.

A first perch 74A is secured to the solenoid housing 24 and provides support for the first spring 68A and a second perch 74B is also secured to the solenoid housing 24 and provides support for the second spring 68B. The first perch 74A defines a first perch passage 76A to allow fluid to exit from the first exhaust port 36A. The second perch 74B defines a second perch passage 76B to allow fluid to exit from the second exhaust port 36B. In FIG. 7 the first perch 74A and the second perch 74B are shown with different cross-sections to fully illustrate the cross-section of the first perch passage 76A and the second perch passage 76B. The first perch passage 76A and the second perch passage 76B have the same general shape which may be fully understood by viewing the cross-sections shown.

The first bypass passage 52A and the second bypass passage 52B may have the same size as one another to maintain the flow of oil to the drip rail 62 (shown in FIG. 3) evenly in both directions. Alternatively, the first bypass passage 52A and the second bypass passage 52B may have different sizes from one another. For example, the first bypass passage 52A and the second bypass passage 52B have different sizes to maintain oil flow evenly over the drip rail 62 (shown in FIG. 3) when the solenoid valve module 10 is not symmetrically located relative to the distribution required by the drip rail.

Rather than having differently sized first and second bypass passages 52A and 52B the first and the second exhaust regulators 60A and 60B be may be sized differently. For, example, the first spring 68A and the second spring 68B may have different spring rates. As stated above, when the first solenoid valve 14A and the second valve 14B are in the de-energized state oil may flow from the first exhaust port 36A and the second exhaust port 36B through the first and second control port 34A and 34B to the latch pins 48. Therefore, the first exhaust regulator 60A and the second exhaust regulator 60B may also have different sizes to maintain desired fluid flow over the latch pins 48 when the first solenoid valve 14A and the second solenoid valve 14B are in the de-energized state.

Additionally, in the embodiment described above, the first solenoid valve has a first exhaust port 36A and a first exhaust regulator 60A and the second solenoid valve has a second exhaust port 36B and a second exhaust regulator 60B. However, the solenoid housing 24 may define a first exhaust port 36A, which is fluidly connected to the first solenoid valve 14A and the second solenoid valve 14B. The flow of oil from the first and the second solenoid valves 14A and 14B may then be controlled by the first exhaust regulator 60A.

In the embodiments described above, the solenoid valve module 10 includes a first solenoid valve 14A and a second solenoid valve 14B. However, greater or fewer solenoid valves may be incorporated into the solenoid valve module 10 as is required by the engine 12. One skilled in the art would be able to determine the number and arrangement of solenoid valves required for a particular engine 12.

While the best modes for carrying out the invention have been described in detail, those familiar with the art to which this invention relates will recognize various alternative designs and embodiments for practicing the invention within the scope of the appended claims.

The invention claimed is:

1. A solenoid valve module comprising:
a first solenoid valve, wherein the first solenoid valve includes a first solenoid portion and a first valve body;
a second solenoid valve, wherein the second solenoid valve includes a second solenoid portion and a second valve body;
a solenoid housing, wherein the first valve body and the second valve body are integrally formed by the solenoid housing, the solenoid housing further defining a first valve stem passage having a first plug removably arranged therein and a second valve stem passage having a second plug removably arranged therein;
a solenoid can secured to the solenoid housing, wherein the first solenoid portion and the second solenoid portion are assembled within the solenoid can; and
a single electrical connector secured to one of the housing and the solenoid can and that provides a common electrical attachment of the first and second solenoid valves to an engine, the single electrical connector configured to allow independent electrical control of the first solenoid valve and the second solenoid valve.

2. The solenoid valve module of claim 1, further comprising a bottom flux collector, wherein the bottom flux collector is operable to collect flux for the first solenoid portion and the second solenoid portion.

3. The solenoid valve module of claim 1, further comprising a top flux collector, wherein the top flux collector is operable to collect flux for the first solenoid portion and the second solenoid portion.

4. The solenoid valve module of claim 3, wherein the top flux collector is the solenoid can.

5. The solenoid valve module of claim 1, wherein the connector is a three prong connector.

6. The solenoid valve module of claim 1, wherein the solenoid housing further defines a supply port, and wherein the supply port is fluidly connected to the first solenoid valve and the second solenoid valve.

7. The solenoid valve module of claim 6, wherein a filter is located within the supply port.

8. The solenoid valve module of claim 6, wherein a pre-regulator is located within the supply port.

9. The solenoid valve module of claim 6, wherein the solenoid housing further defines a first exhaust port and a second exhaust port, and wherein the first exhaust port is fluidly connected to the first solenoid valve and the second exhaust port is fluidly connected to the second solenoid valve.

10. The solenoid valve module of claim 9, wherein the first exhaust port and the second exhaust port are adapted to be fluidly connected to a drip rail of an engine.

11. The solenoid valve module of claim 10, wherein the solenoid housing defines a first control port, a second control port, and a groove surrounding the supply port, the first control port, the second control port, the first exhaust port and the second exhaust port, and wherein a gasket is located within the groove to provide a sealed connection between the supply port, the first control port, the second control port, the first exhaust port, the second exhaust port, and the engine.

12. The solenoid valve module of claim 6, wherein a first exhaust regulator is located in the first exhaust port to control the pressure of fluid exiting the first solenoid valve and a second exhaust regulator is located in the second exhaust port to control the flow of fluid exiting the second solenoid valve.

13. The solenoid valve module of claim 6, wherein the solenoid housing further defines a first exhaust port, and wherein the first exhaust port is fluidly connected to the first solenoid valve and the second solenoid valve.

14. The solenoid valve module of claim 13, wherein a first exhaust regulator controls the pressure of fluid exiting the first solenoid valve and the second solenoid valve.

15. The solenoid valve module of claim 1 wherein the electrical connector is centrally located on the solenoid valve module relative to the first and second solenoid valves.

16. The solenoid valve module of claim 1, further comprising a first and second valve stem disposed in the first and second valve stem passages, respectively of the solenoid housing.

17. A hydraulic control circuit for an engine comprising:
a solenoid valve module including:
a first solenoid valve including a first solenoid portion;
a second solenoid valve including a second solenoid portion;
a solenoid housing that defines a first valve body for the first solenoid valve and defines a second valve body for the second solenoid valve, the solenoid housing further defining (i) a first valve stem passage having a first valve stem and a first plug arranged therein and (ii) a second valve stem passage having a second valve stem and a second plug arranged therein;
a single solenoid can secured to the solenoid housing, wherein the first solenoid portion and the second solenoid portion are assembled within the single solenoid can; and
a single electrical connector secured to one of the single solenoid can and the solenoid housing and that provides a common electrical attachment of the first and second solenoid valves to the engine, the single electrical connector configured to allow independent electrical control of the first solenoid valve and the second solenoid valve,
wherein the solenoid valve module is secured to a surface of the engine.

18. The hydraulic control circuit of claim 17, further comprising a top flux collector, wherein the top flux collector is the single solenoid can and is operable to collect flux for the first solenoid portion and the second solenoid portion.

19. The hydraulic control circuit of claim 17, wherein the solenoid housing further defines a supply port, and wherein the supply port is fluidly connected to the first solenoid valve and the second solenoid valve.

20. The hydraulic control circuit of claim 19, wherein the solenoid housing further defines a first exhaust port and a second exhaust port, and wherein the first exhaust port is fluidly connected to the first solenoid valve and the second exhaust port is fluidly connected to the second solenoid valve.

21. The hydraulic control circuit of claim 20, wherein the solenoid valve module is fluidly connected to the engine such that the first exhaust port and the second exhaust port are fluidly connected to a drip rail for the engine.

22. The hydraulic control circuit of claim 21, wherein a first exhaust regulator is located in the first exhaust port to control the pressure of fluid from the first solenoid valve to the drip rail and a second exhaust regulator is located in the second exhaust port to control the pressure from the second solenoid valve to the drip rail.

23. The hydraulic control circuit of claim 1, wherein the solenoid valve module is secured to the engine cover.

24. The solenoid valve module of claim 17 wherein the electrical connector is centrally located on the solenoid valve module relative to the first and second solenoid valves.

25. A solenoid valve module, comprising:
a first solenoid valve, wherein the first solenoid valve includes a first solenoid portion and a first valve body;
a second solenoid valve, wherein the second solenoid valve includes a second solenoid portion and a second valve body;
a solenoid housing, wherein the first valve body and the second valve body are integrally formed by the solenoid housing, the solenoid housing defining a supply port and one or more exhaust ports, the supply port being fluidly coupled with the one or more exhaust ports by one or more bypass passages, the solenoid housing further defining (i) a first valve stem passage having a first valve stem and a first plug arranged therein and (ii) a second valve stem passage having a second valve stem and a second plug arranged therein;
a solenoid can secured to the solenoid housing, wherein the first solenoid portion and the second solenoid portion are assembled within the solenoid can; and
a single electrical connector secured to one of the housing and the solenoid can and that provides a common electrical attachment of the first and second solenoid valves to an engine, the single electrical connector configured to allow independent electrical control of the first solenoid valve and the second solenoid valve.

26. The solenoid valve module of claim 25, wherein the solenoid housing defines the one or more bypass passages.

27. The solenoid valve module of claim 25, wherein the first and second plugs are configured to be removable from the first and second valve stem passages, respectively, to permit access to the first and second solenoid valves.

28. A solenoid valve module comprising:
- a first solenoid valve, wherein the first solenoid valve includes a first solenoid portion and a first valve body;
- a second solenoid valve, wherein the second solenoid valve includes a second solenoid portion and a second valve body;
- a solenoid housing, wherein the first valve body and the second valve body are integrally formed by the solenoid housing, the solenoid housing further defining a first valve stem passage having a first plug removably arranged therein and a second valve stem passage having a second plug removably arranged therein;
- a solenoid can secured to the solenoid housing, wherein the first solenoid portion and the second solenoid portion are assembled within the solenoid can;
- a supply port, and wherein the supply port is fluidly connected to the first solenoid valve and the second solenoid valve; and
- a first exhaust port and a second exhaust port, and wherein the first exhaust port is fluidly connected to the first solenoid valve and the second exhaust port is fluidly connected to the second solenoid valve.

29. The solenoid valve module of claim 28, further comprising a bottom flux collector, wherein the bottom flux collector is operable to collect flux for the first solenoid portion and the second solenoid portion.

30. The solenoid valve module of claim 28, further comprising a top flux collector, wherein the top flux collector is operable to collect flux for the first solenoid portion and the second solenoid portion.

31. The solenoid valve module of claim 30, wherein the top flux collector is the solenoid can.

* * * * *